(12) United States Patent
Lasich

(10) Patent No.: US 7,550,054 B2
(45) Date of Patent: Jun. 23, 2009

(54) METHOD OF MANUFACTURING MIRRORS FOR A DISH REFLECTOR

(75) Inventor: John Beavis Lasich, Balwyn (AU)

(73) Assignee: Solar Systems Pty Ltd., Hawthorn, Victoria (AU)

( * ) Notice: Subject to any disclaimer, the term of this patent is extended or adjusted under 35 U.S.C. 154(b) by 740 days.

(21) Appl. No.: 10/473,382

(22) PCT Filed: Mar. 28, 2002

(86) PCT No.: PCT/AU02/00401

§ 371 (c)(1), (2), (4) Date: Sep. 26, 2003

(87) PCT Pub. No.: WO02/078933

PCT Pub. Date: Oct. 10, 2002

(65) Prior Publication Data

US 2004/0085659 A1 May 6, 2004

(30) Foreign Application Priority Data

Mar. 28, 2001 (AU) .................................. PR4037

(51) Int. Cl.
*B32B 15/00* (2006.01)
(52) U.S. Cl. .................. 156/254; 156/196; 156/516; 126/689; 126/690; 126/691; 126/573; 126/600; 126/680; 60/641.15; 60/659
(58) Field of Classification Search .................. 126/689, 126/690, 691, 573, 600, 680; 60/641.15, 60/659; 156/196, 254, 516
See application file for complete search history.

(56) References Cited

U.S. PATENT DOCUMENTS

| 4,124,277 | A | * | 11/1978 | Stang | ..................... | 359/846 |
| 4,187,123 | A | | 2/1980 | Diggs | | |
| 4,465,734 | A | | 8/1984 | Laroche et al. | | |
| 4,491,681 | A | | 1/1985 | Kirpich | | |
| 4,807,969 | A | | 2/1989 | Shimodaira et al. | | |
| 6,733,714 | B2 | * | 5/2004 | Oakey et al. | ............... | 264/409 |
| 7,077,532 | B1 | * | 7/2006 | Diver et al. | ............... | 359/871 |

FOREIGN PATENT DOCUMENTS

AU   A 81973/87   6/1989
DE   2945908      5/1981

(Continued)

OTHER PUBLICATIONS

International Preliminary Examination Report of PCT Application No. PCT/AU02/00401.

(Continued)

*Primary Examiner*—Philip C Tucker
*Assistant Examiner*—Kimberly K McClelland
(74) *Attorney, Agent, or Firm*—Klarquist Sparkman, LLP

(57) ABSTRACT

A method of manufacturing a mirror for a dish reflector of a system for generating electrical power from solar radiation is disclosed. The method includes the steps of:
(a) shaping a blank of a deformable material to have a concave surface that is a required surface profile for a mirror; and
(b) glueing, laminating or otherwise adhering together a back surface of a sheet of reflective glass and the concave surface of the shaped blank to form the mirror.

12 Claims, 2 Drawing Sheets

FOREIGN PATENT DOCUMENTS

| | | | |
|---|---|---|---|
| DE | 3612325 | A1 | 10/1986 |
| DE | 4116894 | A1 | 11/1992 |
| DE | 4326845 | A1 | 2/1994 |
| EP | 0464738 | B1 | 1/1992 |
| EP | 0 789405 | A2 | 8/1997 |
| EP | 1126529 | A2 | 8/2001 |
| FR | 2566183 | A1 | 12/1985 |
| JP | 10062017 | A | 3/1988 |
| WO | WO 95/02199 | | 1/1995 |
| WO | WO 97/49956 | | 12/1997 |
| WO | WO 99/57493 | | 11/1999 |
| WO | WO 00/66947 | | 11/2000 |
| WO | WO 02/078933 | A1 | 10/2002 |
| WO | WO 02/080286 | A1 | 10/2002 |

OTHER PUBLICATIONS

International Preliminary Examination Report of PCT Application No. PCT/AU02/00402.

International Preliminary Examination Report of PCT Application No. PCT/AU02/00404.

\* cited by examiner

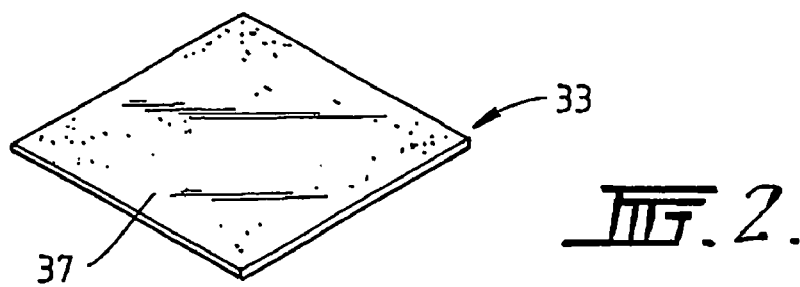
FIG. 2.
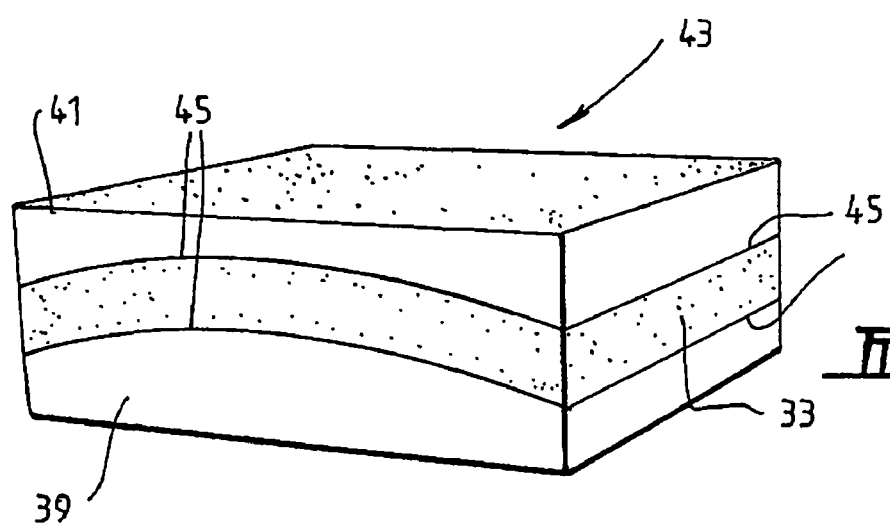
FIG. 3.
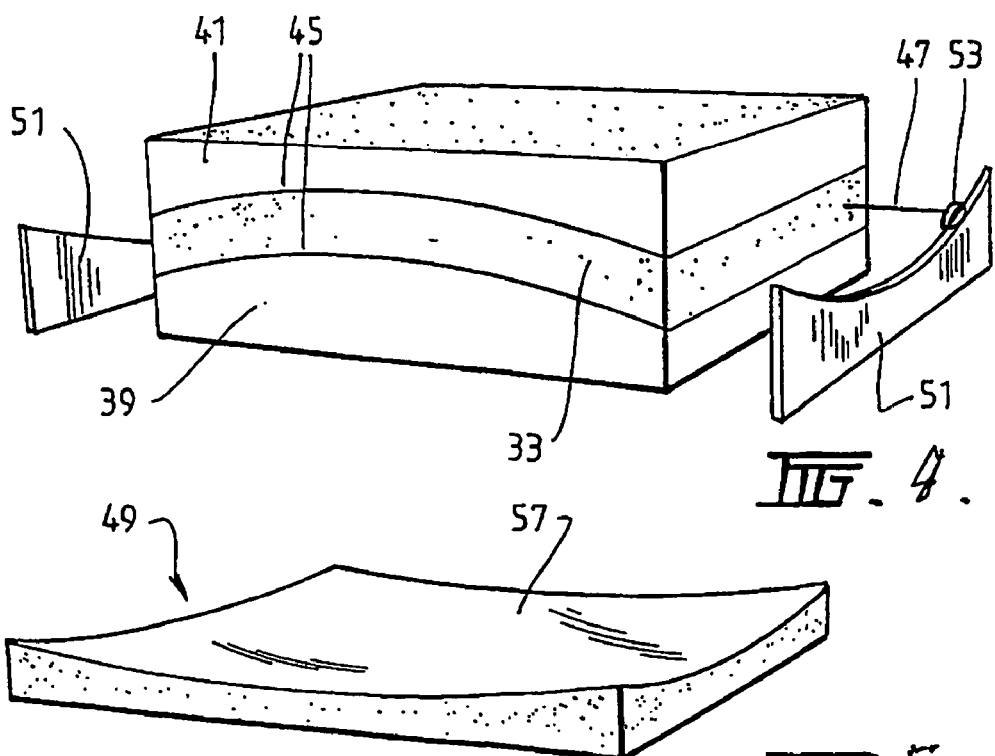
FIG. 4.
FIG. 5.

METHOD OF MANUFACTURING MIRRORS FOR A DISH REFLECTOR

CROSS-REFERENCE TO RELATED APPLICATIONS

This is the National Stage of International Application No. PCT/AU02/00401, filed Mar. 28, 2002, and claims the benefit of Australian Patent Application No. PR4037, filed Mar. 28, 2001.

The present invention relates to a method of manufacturing mirrors.

The present invention relates more particularly to a method of manufacturing mirrors for a dish reflector that forms part of a system for generating electrical power from solar radiation.

The present invention relates more particularly to a method of manufacturing mirrors for a dish reflector of an electrical power generating system that includes:

(a) a receiver that includes a plurality of photovoltaic cells that convert solar energy into electrical energy and an electrical circuit for the electrical energy output of the photovoltaic cells; and (b) a dish reflector that includes an array of mirrors, for example a parabolic array of mirrors, that reflect solar radiation that is incident on the mirrors towards the photovoltaic cells.

Typically, the surface area of the mirrors that is exposed to solar radiation is relatively large compared to the exposed surface area of the photovoltaic cells.

The present invention relates more particularly to a large scale solar radiation-based electrical power generating system of the type described above that is capable of producing substantial amounts of electrical power ready for conditioning to at least 20 kW of standard 3 phase 415 volt AC power.

Applications for such large scale power generating systems include remote area power supply for isolated grids, grid-connected power, water pumping, telecommunications, crude oil pumping, water purification, and hydrogen generation.

One significant issue associated with development of a commercially viable solar radiation-based electrical power generating system of the type described above is to be able to manufacture components of the system cost effectively in a straightforward and uncomplicated manner and on a mass production basis to a consistently high quality.

The mirrors of the dish reflector are one area that is particularly important in this regard.

A conventional method of manufacturing mirrors involves locating relatively thick (of the order of 2 cm) flat sheets of glass into appropriately curved moulds and allowing the glass to slump into the moulds and thereby adopt the curved shape. There are quality issues associated with mirrors made by this method, particularly as the size of the mirrors increases and surface ripples and other irregularities resulting from slumping a flat sheet into a curved sheet become more pronounced. In addition, such mirrors tend to be susceptible to damage on a large scale when exposed to hail and other extreme weather conditions.

An object of the present invention is to provide a method of manufacturing mirrors of a dish reflector that is straightforward, not complicated, and cost effective and can manufacture mirrors on a mass production basis to a consistently high quality.

According to the present invention there is provided a method of manufacturing a mirror for a dish reflector of a system for generating electrical power from solar radiation which includes the steps of:

(a) shaping a blank of a deformable material to have a concave surface that is a required surface profile for a mirror; and (b) glueing, laminating or otherwise adhering together a back surface of a sheet of reflective glass and the concave surface of the shaped blank to form the mirror.

The applicant has found that the above-described method makes it possible to manufacture lightweight mirrors of a high quality and durability in a straightforward manner and inexpensively when compared with the above-described conventional slump glass method. The high quality and durability is due to a number of factors. One factor is that the mirror can be made from relatively thin glass, typically no more than 3mm, and it is possible to use high quality glass that has high surface smoothness that is not affected by the method. Another, although not the only, other factor is that thinner glass is less susceptible to large scale damage due to hail strike and damage tends to be confined to the regions of direct contact.

Preferably step (b) includes pressing together the glass sheet and the shaped blank and allowing a bond to form between the glass sheet and the required concave surface.

The required concave surface may be any suitable surface.

By way of example, the required concave surface may be part spherical, parabolic or hyperbolic.

Preferably step (a) of shaping the blank includes the steps of:

(i) positioning the blank between two opposed curved former surfaces, whereby positioning the blank between the former surfaces so that the former surfaces contact the blank deforms the blank so that the blank conforms to the former surfaces;

(ii) while the blank is positioned in the former between the former surfaces, cutting the blank along a pre-determined path of movement and separating the blank into parts, each part having a cut surface; and (iii) releasing the parts of the blank from the former and returning the parts to a state that the blank was in prior to deforming the blank in step (i), with the result that the cut surface of at least one of the parts defines the required concave surface.

In a situation where the required concave surface is part spherical, in one although not the only embodiment of the present invention step (a) of shaping the blank includes the steps of:

(i) positioning a blank of a deformable material between two halves of a former, each half of the former having a curved former surface that defines part of a cylinder, whereby positioning the blank between the halves so that the former surfaces contact the blank deforms the blank so that the blank conforms to the curved former surfaces and defines part of a cylinder, the longitudinal axis of the cylinder defining a first axis;

(ii) while the blank is positioned between the former halves, cutting the blank along a cylindrical path of movement in the direction of the first axis and separating the blank into two parts, namely a first part and a second part, each part having a cut surface, the longitudinal axis of the cylindrical path of movement defining a second axis, the second axis being perpendicular to the first axis, and (iii) releasing the parts from the former and returning the parts to a state that the blank was in prior to deforming the blank in step (i), with the result that the cut surfaces of the parts define part spherical surfaces, with the first part having a concave surface and the second part having a convex surface.

With this embodiment, one option for step (b) includes positioning the convex surface of the second part against the front surface of the glass sheet, thereby sandwiching the glass sheet between the first and second parts, and thereafter pressing the two parts together to form the bond between the glass sheet and the first part.

With this embodiment, another although not the only other option for step (b) includes positioning the first part and the glass sheet in a press assembly that has a press member that has a convex surface that is complimentary to the concave surface of the first part, thereby sandwiching the glass sheet between the press member and the first part, and thereafter pressing the two parts together to form the bond between the glass sheet and the first part.

In a situation where the required concave surface is part spherical, in another although not the only other embodiment of the present invention step (a) of shaping the blank includes the steps of:

(i) positioning a blank of a deformable material between two halves of a former, each half of the former having a curved former surface that defines part of a sphere, whereby positioning the blank between the halves so that the former surfaces contact the blank deforms the blank so that the blank conforms to the curved former surfaces and defines part of a sphere;

(ii) while the blank is positioned between the former halves, cutting the blank along a straight path of movement and separating the blank into parts, and (iii) releasing the parts from the former and returning the parts to a state that the blank was in prior to deforming the blank in step (i), with the result that the cut surface of at least one of the parts defines a part spherical surface.

The blank may be formed from any suitable material.

One such suitable material is polystyrene foam.

The blank may be any suitable shape.

One suitable shape is a quadrilateral prism.

Preferably the blank is a rectangular prism.

The dimensions of the blank depend in large part on the mirror size required.

By way of example, in a situation where the required mirror is a mirror with a square perimeter with 1.1m sides, it is preferred that the blank be 1 m square and have a thickness of 70 mm.

The mirror may be any suitable shape.

By way of example, the mirror may be square, hexagon, rectangular, or circular.

Preferably the major dimension of the sides of the mirror is at least 0.5 m.

Preferably the mirror has a square perimeter with sides that are at least 0.8 m long.

Preferably the thickness of the glass sheet is no more than 4 mm.

More preferably the thickness of the glass sheet is no more than 2 mm.

It is preferred particularly that the thickness of the glass sheet be no more than 1 mm.

According to the present invention there is also provided a system for generating electrical power from solar radiation which includes:

(a) a receiver that includes a plurality of photovoltaic cells that convert solar energy into electrical energy and an electrical circuit for transferring the electrical energy output of the photovoltaic cells, and (b) a dish reflector that includes an array of mirrors that reflect solar radiation that is incident on the mirrors towards the photovoltaic cells, the mirrors being manufactured by the above-described method.

The present invention is described further by way of example with reference to the accompanying drawings, of which:

FIG. 2 is a perspective view of a blank for use in a preferred embodiment of a method of manufacturing mirrors for the dish reflector of the system shown in FIG. 1;

FIG. 3 is a perspective view that illustrates a first step of the method which includes positioning the blank between the two halves of a former;

FIG. 4 is a perspective view that illustrates a second step of the method which includes operating a wire cutter and cutting the blank located in the former; and FIG. 5 is a perspective view of one of the two parts of the cut blank formed in FIG. 4.

Figure 1:
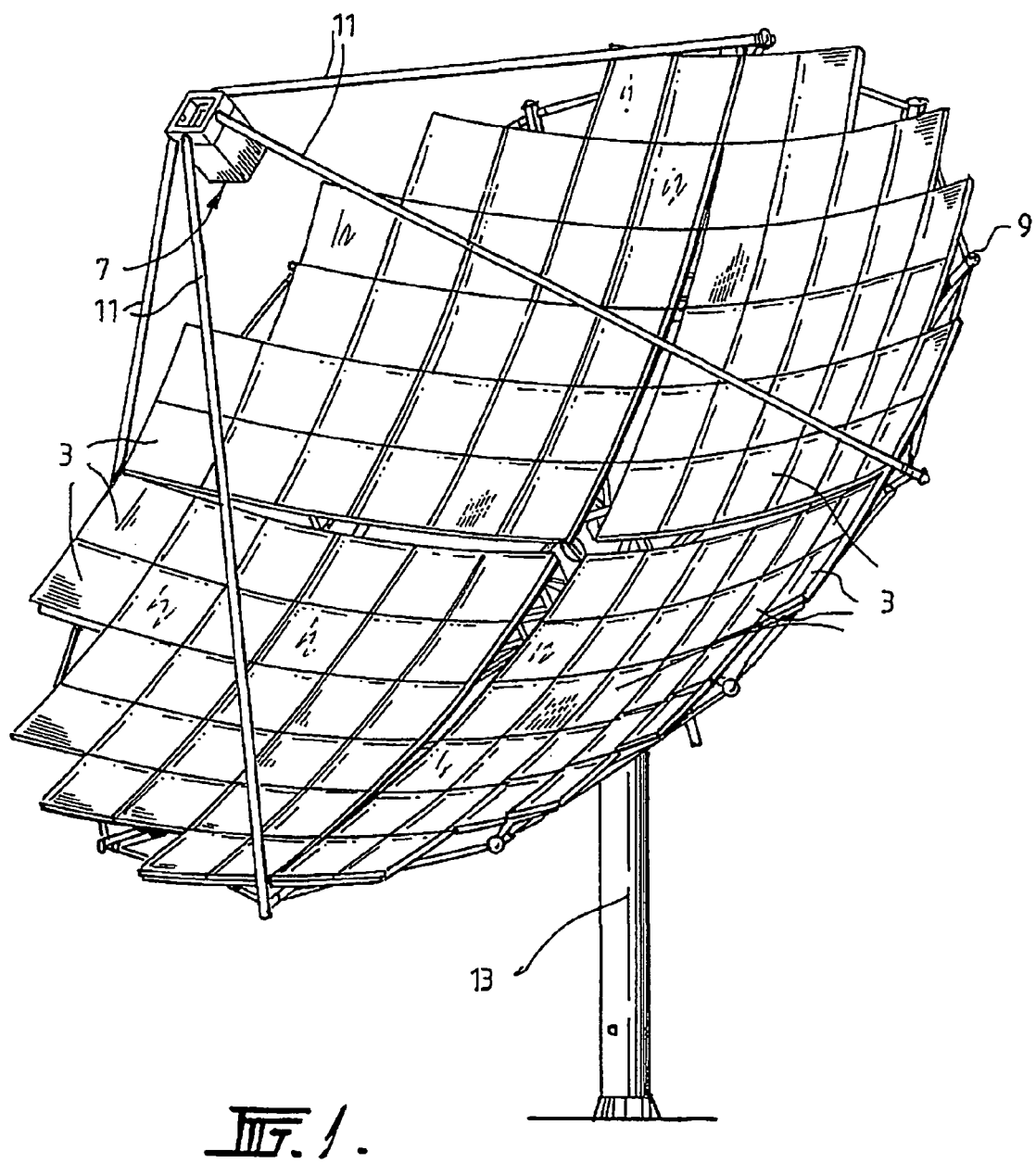
FIG. 1 is a perspective view of a preferred embodiment of a system for generating electrical power from solar radiation.

The solar radiation-based electric power generating system shown in FIG. 1 includes an array of mirrors 3 that reflects solar radiation that is incident on the mirrors 3 towards a plurality of photovoltaic cells (not shown) that form part of a solar radiation receiver, generally identified by the numeral 7.

In the arrangement shown in FIG. 1 the array of mirrors is parabolic. The array may be any other suitable shape.

The surface area of the mirrors 3 that is exposed to solar radiation is substantially greater than the surface area of the photovoltaic cells that is exposed to reflected solar radiation.

In use, the photovoltaic cells convert reflected solar radiation into DC electrical energy.

The receiver 7 includes an electrical circuit (not shown) for the electrical energy output of the photovoltaic cells.

The mirrors 3 are mounted to a framework 9. The mirrors 3 and the framework define a dish reflector.

A series of arms 11 extend from the framework 9 to the receiver 7 and locat the receiver as shown in the Figures.

The system further includes:

(a) a support assembly 13 that supports the dish reflector and the receiver in relation to a ground surface and for movement to track the Sun; and (b) a tracking system (not shown) that moves the dish reflector and the receiver as required to track the Sun.

The photovoltaic cells of the receiver 7 are cooled by coolant, preferably water, in order to minimise the operating temperature and to maximise the performance (including operating life) of the photovoltaic cells. The receiver 7 is purpose-built to include a coolant circuit that supplies coolant that cools the photovoltaic cells.

In the arrangement shown, the dish reflector includes 112 mirrors 3. Each mirror has a square perimeter with 1 m sides. Each mirror 3 has a part spherical surface.

In accordance with the preferred embodiment of the method of the present invention, each mirror 3 is formed by a sequence of steps which includes:

(a) shaping a blank of a suitable material, such as polystyrene foam, to have a part spherical concave surface; and (b) adhering a reflective glass sheet to the concave surface of the shaped blank.

The sequence of steps described in sub-paragraph (a) of the preceding paragraph is partially illustrated in FIGS. 2-5.

FIG. 2 illustrates one suitable form of blank 33. The blank 33 is a rectangular prism having 1 m sides and a thickness of 60 mm. The blank 33 has parallel flat upper and lower surfaces 37.

With reference to FIG. 3, a first step of the method of forming a mirror 3 includes locating the blank 33 between two halves 39, 41 of a former assembly, generally identified by the numeral 43.

Each half 39, 41 of the former assembly 43 includes a cylindrical surface 45 having a radius of the order of 16 m.

Positioning the blank 33 so that it is sandwiched between the halves 39, 41 deforms the blank 33 from the shape shown in FIG. 2 so that the blank 33 assumes a part cylindrical shape, as shown in FIG. 3.

With reference to FIG. 4, a second step of the method of forming a mirror 3 includes moving a wire cutter 47 along a cylindrical path of movement through the deformed blank 33 and thereby cutting the blank into two parts, namely an upper part and a lower part.

The cylindrical path is defined by cylindrical tracks 51 located on opposite sides of the former assembly 43. Opposite ends of the wire cutter 47 are connected to guides 53 that are mounted on the tracks 51. With this arrangement, movement of the guides 53 along the tracks 51 constrains the wire cutter to move in the cylindrical path defined by the tracks 51.

The cylindrical tracks 51 are positioned so that the axis of the cylinder is perpendicular to the axis of the deformed blank 33.

After cutting the blank 33, the next step of the method includes removing the two parts of the blank 33 from the former assembly 43 and returning the parts to the undeformed state, ie the original pre-former assembly state. Consequently, the cut surfaces of the blank 33 form a concave surface in one of the parts and a convex surface in the other of the parts.

FIG. 5 illustrates the part, generally identified by the numeral 49, that has the concave surface. In the Figure, the concave surface is identified by the numeral 57.

The next step of the method of forming a mirror 3 includes adhering a sheet of reflective glass (not shown) onto the concave surface 57 of the part 49.

The mirror 3 may be adhered by any suitable means. By way of example, the mirror 3 may be adhered by the use of a suitable glue. By way of further example, the mirror 3 may be adhered by the use of a suitable laminating compound.

The next step of the method of forming a mirror 3 includes pressing together the glass cover sheet and the part 49 for a period of time that is sufficient to allow a bond to form between the two contacting surfaces, thereby forming the mirror 3.

The above-described method has a number of important features. By way of example, the method is straightforward and uncomplicated and makes it possible to mass produce mirrors of consistent quality using low capital cost equipment.

Many modifications may be made to the preferred embodiment of the method of the present invention that is described above without departing from the spirit and scope of the present invention.

The invention claimed is:

1. A method of manufacturing a mirror for a dish reflector of a system for generating electrical power from solar radiation which includes the steps of:
   (a) shaping a blank of a deformable material to have a concave surface that is a required surface profile for a mirror; and
   (b) adhering a back surface of a sheet of reflective glass to the concave surface of the shaped blank to form the mirror;

wherein the concave surface is part spherical and step (a) of shaping the blank further includes the steps of:
   (i) positioning the blank between two halves of a former, each half of the former having a curved former surface that defines part of a cylinder, wherein the act of positioning comprises positioning the blank between the halves so that the former surfaces contact the blank and deforms the blank so that the blank conforms to the curved former surfaces and defines part of a cylinder, the longitudinal axis of the cylinder defining a first axis;
   (ii) while the blank is positioned between the former halves, cutting the blank along a cylindrical path of movement in the direction of the first axis and separating the blank into a first part and a second part, each part having a cut surface, the longitudinal axis of the cylindrical path of movement defining a second axis, the second axis being perpendicular to the first axis, and
   (iii) releasing the parts from the former and returning the parts to a state that the blank was in prior to deforming the blank in step (i), with the result that the cut surfaces of the parts define part spherical surfaces, with the first part having a concave surface and the second part having a convex surface.

2. The method defined in claim 1 wherein step (b) includes pressing together the glass sheet and the first part of the shaped blank and allowing a bond to form between the glass sheet and the concave surface.

3. The method defined in claim 1 wherein step (b) includes positioning the convex surface of the second part against the front surface of the glass sheet, thereby sandwiching the glass sheet between the first and second parts, and thereafter pressing the two parts together to form the bond between the glass sheet and the first part.

4. The method defined in claim 1 wherein step (b) includes positioning the first part and the glass sheet in a press assembly that has a press member that has a convex surface that is complimentary to the concave surface of the first part, thereby sandwiching the glass sheet between the press member and the first part, and thereafter pressing the two parts together to form the bond between the glass sheet and the first part.

5. The method defined in claim 1 wherein the blank is formed from polystyrene foam.

6. The method defined in claim 1 wherein the blank is a quadrilateral prism.

7. The method defined in claim 1 wherein the blank is a rectangular prism.

8. The method defined in claim 1 wherein the major dimension of the sides of the mirror is at least 0.5 m.

9. The method defined in claim 1 wherein the mirror has a square perimeter with sides that are at least 0.8 m long.

10. The method defined in claim 1 wherein the thickness of the glass sheet is no more than 4 mm.

11. The method defined in claim 1 wherein the thickness of the glass sheet is no more than 2 mm.

12. The method defined in claim 1 wherein the thickness of the glass sheet is no more than 1 mm.

* * * * *